No. 897,083. PATENTED AUG. 25, 1908.
S. C. GLIDDEN.
HOOK AND EYE.
APPLICATION FILED FEB. 29, 1908.

Inventor
Stephen C. Glidden

Witnesses
J. L. Wright
P. M. Truitt

By Victor J. Evans
Attorney.

UNITED STATES PATENT OFFICE.

STEPHEN C. GLIDDEN, OF DANVILLE, ILLINOIS.

HOOK AND EYE.

No. 897,083.              Specification of Letters Patent.           Patented Aug. 25, 1908.

Application filed February 29, 1908. Serial No. 418,538.

*To all whom it may concern:*

Be it known that I, STEPHEN C. GLIDDEN, a citizen of the United States, residing at Danville, in the county of Vermilion and State of Illinois, have invented new and useful Improvements in Hooks and Eyes, of which the following is a specification.

This invention relates to hooks and eyes and the object of the same is to provide a hook and eye device in which the members are so formed and related that either when in engagement or out of engagement, any pressure brought to bear thereon, as by stepping upon either member or passing a flat-iron or sad-iron over either member will not in the slightest impair the working efficiency of the members in their relation to each other nor interfere in the slightest with the subsequent engagement and disengagement of the members.

With the above and other objects in view, the invention consists in the novel construction, combination and arrangement of parts as herein fully described, illustrated and claimed.

Figure 1:
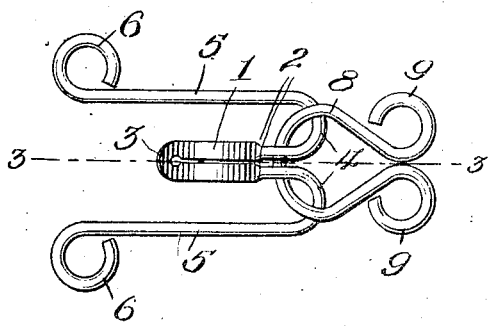
Figure 4:
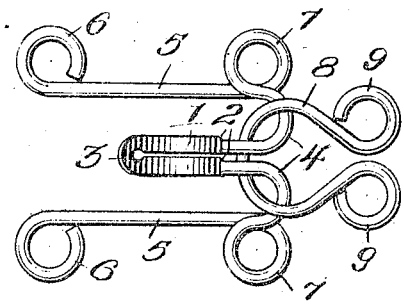
Figure 2:
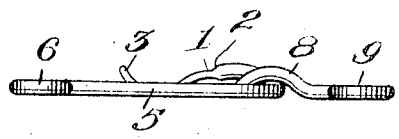
Figure 5:
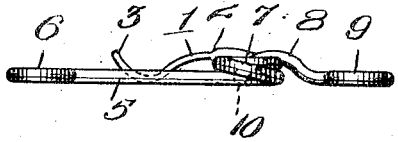
Figure 3:
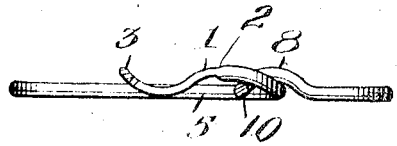

In the accompanying drawing:—Figure 1 is a plan view of a hook and eye device embodying the present invention. Fig. 2 is a side or edge view of the same. Fig. 3 is a longitudinal section through the same. Fig. 4 is a plan view of the members, showing a modification of the hook member, and Fig. 5 is a side or edge view of the same.

The hook member is formed of a piece of spring wire of suitable length the same being bent or recurved at a central point to form the bill 1 of the hook member and the said bill is mashed or flattened and thereby broadened as shown in Figs. 1 and 2 forming oppositely arranged guard shoulders 2 at the inner portion of the flattened part of the bill of the hook while the extremity of the hook is flattened and the entire bill of the hook is given a compound or ogee bend as clearly shown in Fig. 3, the bill of the hook thus acting itself as a guard to prevent the accidental escape of the eye member hereinafter particularly referred to. The extremity of the bill 1 of the hook is deflected away or to one side of the plane of the body of the hook to form a deflected engaging lip 3. After forming the centrally arranged point of the hook, the terminal portions of the wire are recurved in opposite directions as shown at 4 and then carried along parallel with each other and with the bill of the hook as shown at 5 and after extending such side portions or bars they are bent outwardly and formed into attaching eyes 6.

A modification of the arrangement shown in Fig. 1 is illustrated in Fig. 4 wherein it will be observed that other attaching eyes 7 are formed at the inner ends of the side bars 5, the same consisting preferably of single coils formed by properly bending the wire at such parts.

The eye member comprises a substantially circular or pear-shaped eye portion 8 through which the bill 1 of the hook is adapted to be inserted, the eye member terminating in attaching eyes 9. By reference to Figs. 2 and 3, and 5, it will be observed that the body portion of the eye member is curved or given an arcuate bend thereby forming what I term an engaging lip 10 which is disposed reversely to the engaging lip 3 of the hook. This arrangement of the engaging lips admits of their ready engagement with each other and as the hook member is drawn through the eye, the eye member, or the hook member, as the case may be is deflected from the normal plane in order to cause the hook and eye members to pass by each other. When the hook and eye members are in final position of engagement, the bodies of said parts lie in a common plane as shown in Figs. 2, 3 and 4.

From the foregoing description it will be understood that the hook and eye members can not, on account of their special formation and arrangement, be mashed or bent out of shape by any ordinary pressure so as to render the same inefficient thus adding greatly to the life and durability of the hook and eye device, making the same more reliable and satisfactory in use.

Instead of flattening the bill 1 of the hook, it may be left plain or unflattened without impairing the interlock between the hook and eye members.

Having thus described the invention, what is claimed as new is:—

A hook and eye device comprising hook and eye members each provided with attaching eyes arranged in a common plane with each other and with the main body portions of the members, the hook and eye members being provided with reversely deflected lips and the hook member comprising parallel sides and a bill parallel with and located between the sides, said bill being offset or deflected into the plane of the body to form a guard between the extremity of the bill and the base of the hook.

In testimony whereof I affix my signature in presence of two witnesses.

STEPHEN C. GLIDDEN.

Witnesses:
GEORGE T. BUCKINGHAM,
CHARLES TROUP.